United States Patent [19]
Eslinger et al.

[11] Patent Number: 5,684,596
[45] Date of Patent: Nov. 4, 1997

[54] METHOD AND APPARATUS FOR MEASURING AXIAL AND TORSIONAL LOADS ON A VALVE STEM

[75] Inventors: Rodney M. Eslinger, Marietta; Christopher P. Smith, Acworth; David E. Morlan; Klane B. Anderson, both of Marietta, all of Ga.

[73] Assignee: Westinghouse Electric Corporation, Pittsburgh, Pa.

[21] Appl. No.: 399,417

[22] Filed: Mar. 6, 1995

[51] Int. Cl.$^6$ .................................... G01B 11/00
[52] U.S. Cl. .................. 356/372; 356/373; 356/228
[58] Field of Search .................. 356/372, 383, 356/384, 385; 73/800; 177/211, DIG. 6

[56] References Cited

U.S. PATENT DOCUMENTS

| | | |
|---|---|---|
| 4,962,669 | 10/1990 | Gernhart et al. |
| 5,056,046 | 10/1991 | Mutchler et al. |
| 5,123,283 | 6/1992 | Duff et al. |
| 5,199,304 | 4/1993 | Ferguson |
| 5,231,469 | 7/1993 | Jeffers et al. ............ 356/373 |

FOREIGN PATENT DOCUMENTS

| | | |
|---|---|---|
| 0348039 | 12/1989 | European Pat. Off. |
| 3709598 | 10/1988 | Germany |
| 3720248 | 1/1989 | Germany |
| PCT/US91/ 08283 | 11/1991 | WIPO |

*Primary Examiner*—Frank G. Font
*Assistant Examiner*—Reginald A. Ratliff
*Attorney, Agent, or Firm*—Isaf, Vaughan & Kerr; Louis T. Isaf

[57] ABSTRACT

An optical system for determining the axial load, the torsional load or both on a generally cylindrical member, such as a valve stem in a motor operated valve, includes a first system for producing a test light that is modified by a physical change in the valve stem caused by the load, a second system for receiving the test light and converting the same to a first signal indicative of the physical change, and a third system for converting the first signal to a second signal indicative of the load, preferably by utilizing one or more of the relations defined in Equations 1-3. The physical change in the cylindrical member can be, for example, a diametrical change or a longitudinal change, which can be measured by the first and second systems. The dimensional changes can be related to the axial load according to Hooke's Law or Poisson's relation by the third system when material properties and the geometry of the cylindrical member are known. Similarly, the torsional load applied to the cylindrical member can be obtained by measuring the twist angle between two longitudinally separated planes of the member, and applying a known relation between the twist angle and known geometric and material characteristics of the cylindrical member.

57 Claims, 12 Drawing Sheets

METHOD AND APPARATUS FOR MEASURING AXIAL AND TORSIONAL LOADS ON A VALVE STEM

BACKGROUND OF THE INVENTION

1. Field of the Invention

This invention relates to a method and apparatus for measuring and monitoring axial and torsional loads on a cylindrical member, and, in particular, it relates to an optical device and method for measuring slight diametrical changes, length changes, and twist angles in a cylindrical member, such as a valve stem of a motor operated valve, that can be used for determining the axial loading and the torsional loading on the cylindrical member.

2. Description of the Prior Art

In many industries, it is important to measure the variable dynamic or static axial loads that may be imposed on a cylindrical member or shaft. This is especially true in the nuclear power industry where motor operated valves (MOV's) are used extensively. Monitoring of the various operating parameters of the valves are required by the nuclear power regulating agencies. MOV's are comprised generally of an electric motor driven actuator that is connected to a valve stem and a valve yoke that partially surrounds the valve stem. Rotation of the valve stem nut by the valve actuator will move the valve stem and a valve plug or gate into a closed, open or intermediate position with respect to a valve seat in the body of the valve.

When the valve plug or gate is moved to the fully closed or to the fully open position, the valve stem nut continues to apply a generally axial force to the valve stem until a stop signal removes power from the valve motor. The axial force imposes an axial load on the valve stem and an equal and opposite axial load on the valve yoke. The axial loads cause axial and diametral changes to the dimensions of the valve stem and the valve yoke.

U.S. Pat. Nos. 4,911,004, 4,930,228, 4,936,150 and 5,123,283 describe several prior art devices and systems that have been developed for measuring diametrical and axial strains and loads in a valve stem. Most of the prior art devices used in MOV's use devices such as strain gauges or proximity sensors to measure diametrical changes in the valve stem. Many of the prior art devices are mechanically complicated, difficult to set up, calibrate and remove in the field.

An anti-rotation device is normally incorporated into an MOV for preventing rotational movement of the valve stem. The anti-rotation device is typically mounted on the valve end of the stem, and often provided by the plug of the valve. The anti-rotation device leads to torsional deformations on the stem as well as the dimensional changes discussed hereinbefore. Existing devices generally attempt to minimize the output caused by the torsional deformation. There is a varying degree of success in the different designs, but they all exhibit some output relating to torque. Since this output can not be distinguished from the output relating to the axial load, the error statement must allow for the existence of this torque. For most of the existing devices, this torsion error is the largest component of the overall error.

Optical devices hold out the possibility of providing greater accuracy than prior art devices. For example, laser interferometers can provide measurement accuracies of a fraction of a wavelength of the light used in the measurement. Optical devices can also be more convenient because they are generally less complicated mechanically and generally do not require extensive calibration. Heretofore, optical devices have been used to monitor only the displacement of the valve stem. For example, U.S. Pat. No. 5,056,046 discloses a method for measuring the stem displacement of a valve of the type in which a portion of the stem is visible. Discrete signals generated in a video camera due to movement of the stem are converted to distance units for measuring the stem displacement. U.S. Pat. No. 5,231,469 discloses a valve stem position monitor that directs a laser beam parallel to the valve stem to a reflector attached to the valve stem. A sensor, fixed to the base of the valve yoke, receives the reflected image of the pulse beam and the displacement of the valve stem is determined from the timing of the pulse and the received reflected beam.

However, these devices are not capable of measuring the axial or torsional loads that valve stems are sometimes subjected to. There is therefore a need for new optical methods and devices for measuring valve stem forces.

SUMMARY OF THE INVENTION

It is therefore an object of this invention to provide improved devices and methods for measuring forces applied to a valve stem.

It is another object of the invention to provide optical methods and devices for measuring an axial load in a valve stem that is mechanically simple, relatively inexpensive and easily installed on commercial motor operated valve.

It is another object of this invention to provide an apparatus and method for measuring diametrical changes in a valve stem or other cylindrical member that is able to provide direct dynamic measurement of the axial loads on a movable valve stem.

It is another object of this invention to provide an apparatus for determining length changes in a valve stem or other cylindrical member that is able to provide direct dynamic measurement of the axial loads on a moveable valve stem.

It is another object of this invention to provide an apparatus and method for determining axial loads in a valve stem or other cylindrical member that accounts for torsional loads on the valve stem.

These and other objects of this invention can be obtained by an optical system for determining the dimensional changes in a substantially cylindrical member, such as a valve stem of a motor operated valve, produced by axial loads, torsional loads, or both, imposed on the cylindrical member. When a generally cylindrical column, such as a valve stem, is subjected to an axial force, the change in length of the column can be related to the applied force using Hooke's law according to:

$$\Delta L = \frac{FL}{AE} \qquad (1)$$

where L is the gage length in inches, $\Delta L$ is the change in axial length in inches, F is the axial load in pounds, A is the cross sectional area in square inches, and E is Young's modulus of elasticity for the column material in pounds per square inch. The change in length, or axial strain, is also accompanied by a lateral strain, or changing cross-sectional dimensions, which can be related to the axial force applied using Poisson's ratio and Hooke's law according to:

$$\Delta D = \frac{\nu DF}{AE} \qquad (2)$$

where D is the lateral gauge length for the measurement in inches, $\Delta D$ is the change in lateral dimension in inches, $\nu$ is Poisson's ratio for the column material, and F, A and E are defined as in Equation 1. An applied torque can also cause a physical change in a column, such as a valve stem. A torque will cause a relative twist between two points on longitudinally separated planes according to the relation:

$$\Theta = \frac{TL}{GJ} \qquad (3)$$

where T is the applied torque, L is the distance between the planes of interest, θ is the relative twist angle, G is the modulus of rigidity of the shaft, and J is the polar moment of inertia for the shaft.

Poisson's ratio ν and Young's modulus of elasticity E are generally known and available for most materials. Therefore, by measuring the diametrical changes in the valve stem or cylindrical member, or by measuring longitudinal changes in the valve stem or cylindrical member, axial strains and valve stem axial loads can be easily calculated and determined. Similarly, the modulus of rigidity G and the polar moment of inertia J can also be obtained easily. A torsional load, or torque, applied to a cylindrical member, or valve stem, can be obtained by measuring the twist angle between two longitudinally separated planes of the member.

Using these relations, the invention provides an optical device for measuring a load on a generally cylindrical-shaped valve stem mounted in a motor operated valve, the valve stem being movable in a longitudinal direction defined by a cylindrical axis of the valve stem. The load can be an axial load (thrust), a torsional load (torque) or both. The optical device includes a first system for producing a test light that is modified by a physical change in the valve stem caused by the load, a second system for receiving the test light and converting the same to a first signal indicative of the physical change, and a third system for converting the first signal to a second signal indicative of the load, preferably by utilizing one or more of the relations defined in Equations 1–3.

According to one aspect of the invention, the physical change can be manifested by a change in a distance between spaced apart first and second points on the valve stem. The first and second points can be circumferentially spaced apart, preferably diametrally opposed from each other, wherein the physical change includes a change in the diameter of the valve stem. The first signal is indicative of an axial load on the valve stem. The third system responds to the first signal by determining the axial load according to Equation (2).

The first and second points can alternatively be spaced apart in a direction substantially parallel to the cylindrical axis. In this case, the physical change includes a change in the length of the valve stem. As in the previous case, the first signal is indicative of the axial load on the valve stem. However, in this case the third system determines the load according to Equation (1).

According to another aspect of the invention, the physical change can be a change in the polar angle between two fixed points on the valve stem that are in planes that are axially spaced apart. The second signal in this case is indicative of a torsional load, or torque, on the valve stem. In this embodiment, the third system determines the torque according to Equation (3) in response to the first signal.

According to another aspect of the invention, the physical change can include a change in the polar angle between two fixed points on the valve stem that are in planes that are axially spaced apart and also a change in the distance between two points on the valve stem that are spaced apart either of circumferentially or axially. Simultaneous measurement of these two parameters yields information from which both the torsional load and the axial load can be determined.

The foregoing objects and aspects of the invention will be more fully understood from the following description of the invention with reference to exemplary embodiments as illustrated in the drawings appended hereto.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variations within the scope of the appended claims. In the drawings.

DETAILED DESCRIPTION OF THE PREFERRED EMBODIMENTS

Figure 1:
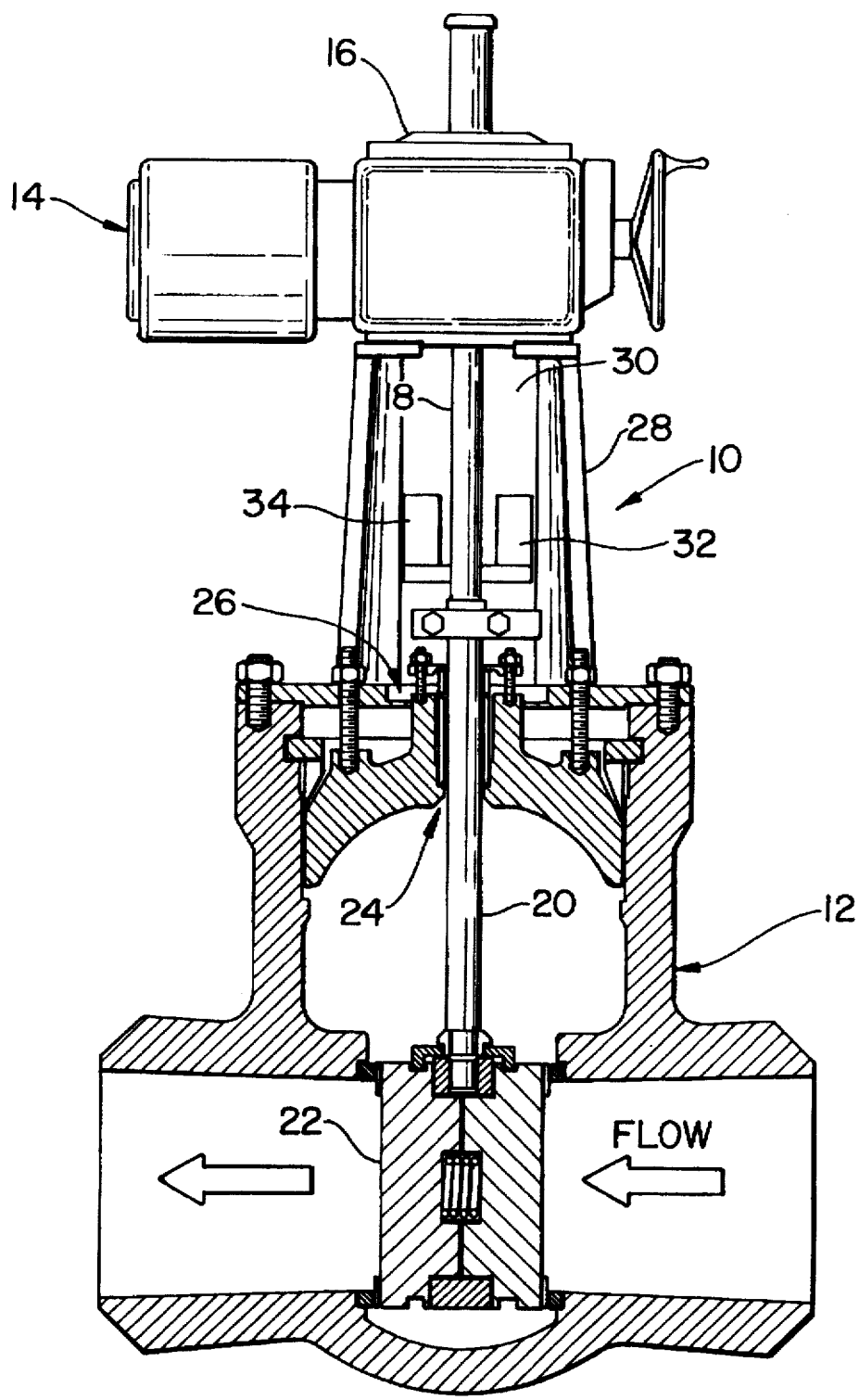
FIG. 1 is an elevation view, partially broken away, of a typical motor operated valve having an optical device according to the invention clamped to the valve stem.

Referring now to the drawings, FIG. 1 illustrates a typical motor operated valve (MOV) 10 used in the nuclear power industry. The valve controls fluid flow through pipes (not shown) connected to the inlet and outlet ends of a valve body 12. The MOV includes a motor 14 that controls operation of a an actuator mechanism (not shown) located in a gear box 16. The actuator operates to move a valve stem 18 in a direction transverse to the direction of flow. The valve stem 18 is coupled at its lower end to an upper end of a connecting rod 20 that in turn is coupled at its lower end to a valve gate 22. The connecting rod 18 passes through a seal 24 in a valve bonnet 26 in the valve body 12. The valve bonnet 26 is rigidly coupled to the gear box 16 by a generally cylindrically shaped valve yoke 28 that typically has a long aperture 30 that permits access to the valve stem 18. The gate 22 is shown in FIG. 1 in a lowered position such that the MOV 10 is closed. The MOV 10 is opened when the gate 22 is raised (not shown) into a space defined by the valve body 12.

Operation of the actuator mechanism can apply significant torsional and axial loads on the valve stem 18. According to the invention, an optical system for measuring a load on the stem 18 includes a light source 32 for providing a test light and a light sensor 34 for receiving the test light after being modified by a physical change in the valve stem 18 and producing a signal indicative of the physical change, wherein the physical change is indicative of the load. The load is then determined from that measurement. Since the valve yoke 28 experiences loads that are equal and opposite to those experienced by the valve stem 18, in many instances the measurement can alternatively be made upon the valve yoke 28 instead of upon the valve stem 18.

Figure 2:
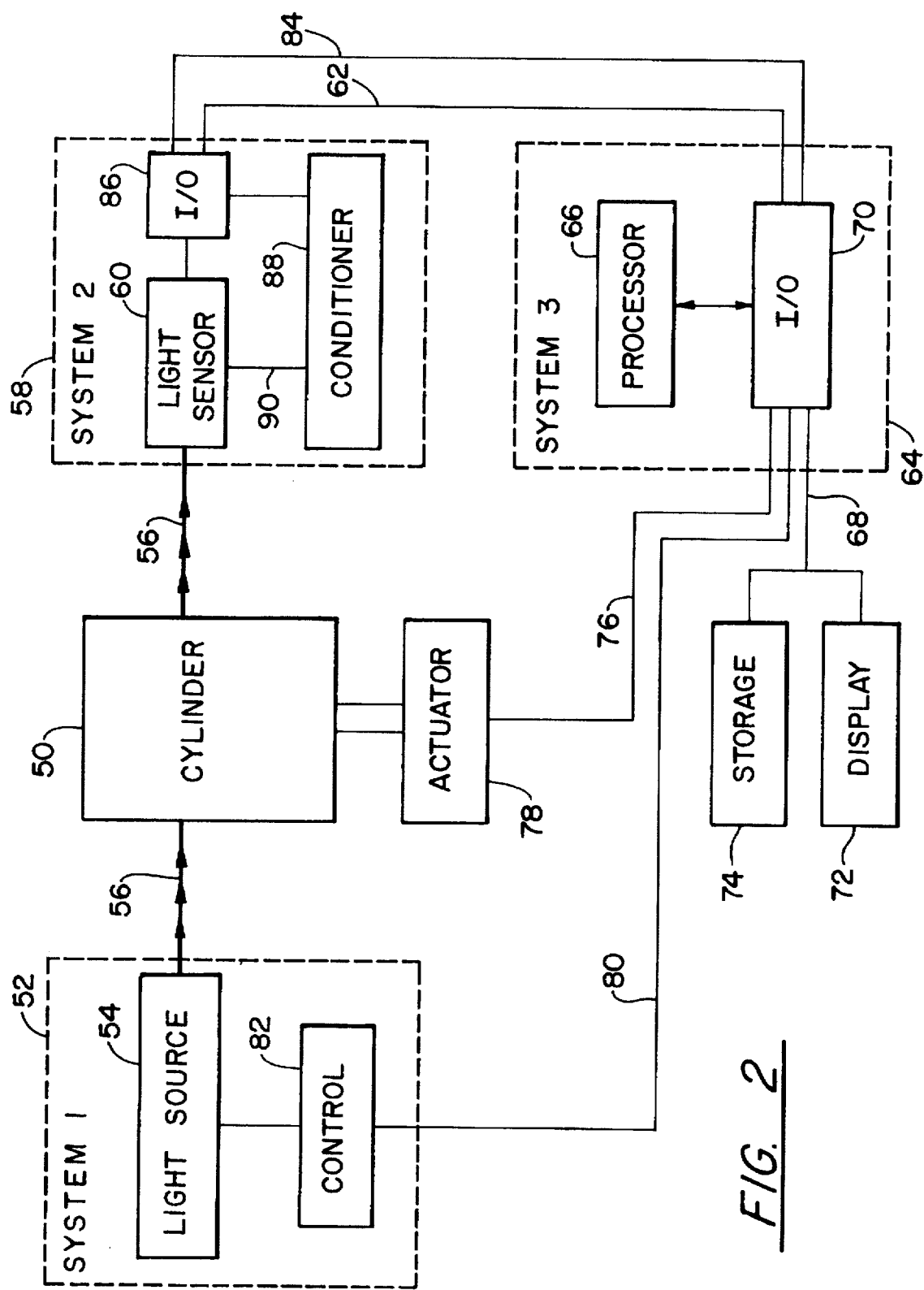
FIG. 2 is a block diagram illustration of the invention.

FIG. 2 schematically illustrates an optical system for measuring a load on a substantially cylindrical member 50, such a valve stem in an MOV. The system includes a first system 52 that includes a light source 54 for producing a test light 56 that is modified by a physical change in the cylindrical member 50 that is caused by the load, a second system 58 that includes a light sensor 60 responsive to the test light 56 and for converting the same to a first signal 62 indicative of the physical change, and a third system 64, including a data processor 66 such as a programmable processor or computer responsive to the first signal 62 for determining the load and producing a second signal 68 indicative of the load.

Second signal 68 can be output via a first communications I/O port 70 to a display system 72, such as, for example, a numeric display, an oscilloscope, a printer, a chart recorder or any other appropriate display device. The second signal 68 can also be output to a storage device 74 for later retrieval, such as, for example, disk or tape storage, computer memory or any other type of suitable data storage device. The third system 64 can also include circuitry for using the load information contained in either of first signal 62 or second signal 68 to provide a feedback control signal 76 to an actuator system 78 mechanically linked to the cylinder 50. In addition, the third system 64 can provide an illumination control signal 80 to control circuitry 82 for the light source 54 and a sensor control signal 84 to the second system 56 via a second communications I/O port 86 located therein. The second system 58 can also include a signal conditioning circuit 88 for smoothing and/or digitizing the light sensor output 90. Alternatively, the signal conditioning circuit 88 can be packaged in the third system 64.

Figure 3:
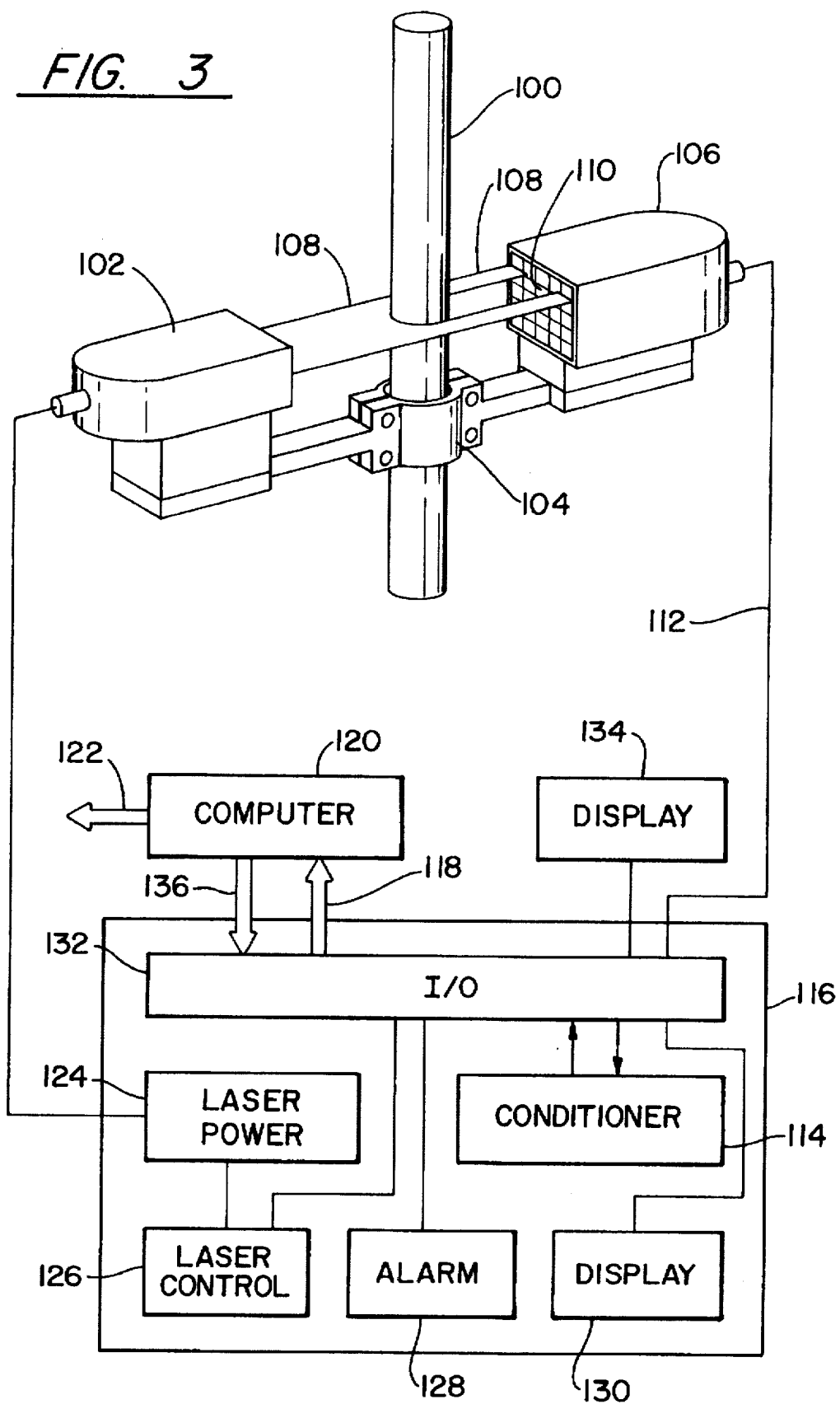
FIG. 3 is a perspective view of one embodiment of the invention that uses an obscuration technique to obtain a measurement of an axial load on a valve stem.

A first embodiment of the invention that utilizes a obscuration technique to obtain a measurement of changes in the diameter of a valve stem 100 is illustrated in FIG. 3. A stable, wide parallel laser 102, such as, for example, a Keyence model LX2 or LS-3100, is mounted several inches from one side of valve stem 100 by means of a V-block clamping hardware 104 or other suitable clamping mechanism. A photoelectric sensor 106 having a frequency sensitivity matched to the laser 102 is mounted opposite the laser 102 on the other side of the stem. The sensor can be mounted to an extension of the mounting hardware 104. The laser 102 produces a test light in the form of a beam 108 that travels through an internal projecting lens (not shown) that causes the beam 108 to be in a parallel profile in a plane substantially transverse to the longitudinal axis of the valve stem 100. The valve stem 100 obscures a portion of the illumination of a receptive surface 110 of sensor 106 by the beam 108. In one embodiment, the sensor 106 produces an analog output signal that changes linearly with changes in the intensity of light received, which is directly related to the width of the obscuration. The output signal 112 from the sensor 106 preferably is then electronically smoothed and digitized by signal conditioner circuit 114 in a controller module 116. The output of the conditioner circuit is a first signal 118 that is indicative of the width of the obscuration and provides a measurement indicative of the diameter of the valve stem 100. The first signal 118 is then converted, according to Equation (2), by a programmed data processor, such as computer 120, to a second signal 122 that is indicative of the axial strain on the stem.

The controller 116 also preferably includes a power supply 124 and other control circuitry 126 for driving the laser 102. The controller 116 can include built in alarms 128 that can be preset for specific conditions on the valve stem 100, such as, for example, corresponding to an excessive axial load or a zero load condition. The controller 116 preferably also includes a digital display 130 and a communications I/O device 132 for sending the first signal 118 to the computer 120 for analysis, storage or output to another display device 134, such as an oscilloscope or chart recorder, and for receiving signals, such as the output signal 112 and control or data signals 136 from the computer 120.

Figure 4:
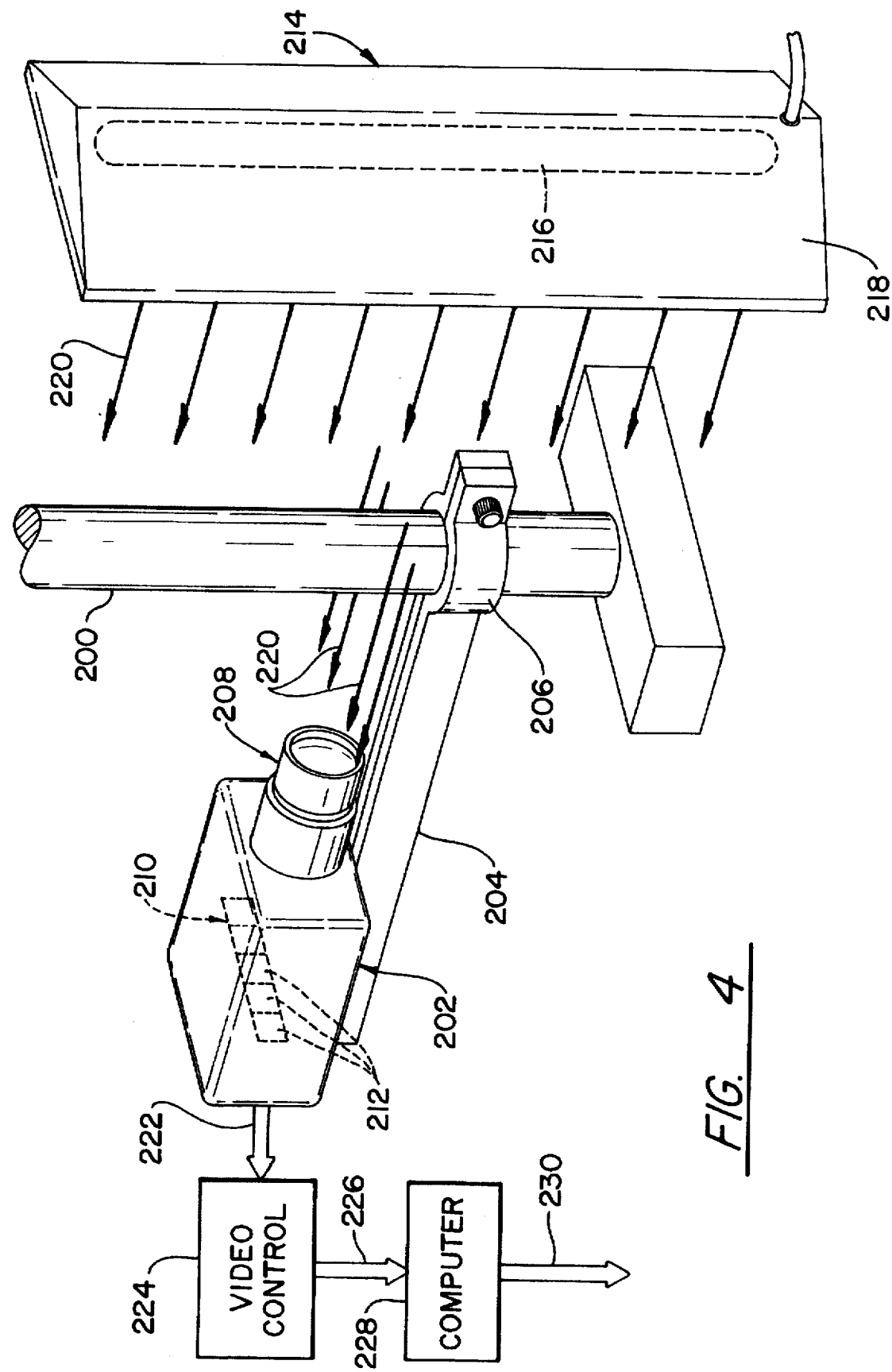
FIG. 4 is a perspective view of a second embodiment of the invention different from that illustrated in FIG. 2 that also uses obscuration to obtain a measurement of an axial load on a valve stem.

In another embodiment of the invention using an imaging technique that is illustrated in FIG. 4, the change in diameter of a valve stem 200 can be measured with an image sensor, preferably provided by a CCD camera 102, such as, for example, one of the Sunx IX-S or IX-N series cameras. The camera 202 can be mounted on an adjustable track 204 several inches from one side of the valve stem 200 by means of a V-block clamp 206 or other suitable hardware. The camera 202 includes an adjustable lens 208 focuses to form a sharp image of the valve stem 200 edges and a linear array sensor 210 having a plurality of discrete, small area photosensor elements 212, each having an associated address.

A typical array sensor 210 would consist of 4096 discrete sensors elements 212 having a 7 µm pitch. The resolution depends on the size of the field projected onto the array 210 according to the relation R=S/N, where R is the resolution, S is the field size and N is the number of elements in the array. For example, if S=8.2 cm and N=4096, R is about 20 µm.

Positioned on the opposite side of the stem is a stable light source, such as, for example, a light bank 214. The positioning of the light source is important as the camera 202 will typically need a stable source of background light. The light bank 214 is preferably placed between two and eight inches from the valve stem 200. The light bank 214 can either be attached to the valve stem 200 similarly to the camera (not shown), or the light bank 214 can be decoupled from the valve stem 200 as illustrated in FIG. 4. The light bank 214 includes one or more light sources 216, such as, for example, dispersed white light source, or a DC voltage or high frequency type light, enclosed in a cabinet 218 that has a partially opaque lens or cover (not shown) over the lights 216 in order to make a test light, or illumination 220 uniform over the entire area. The light bank 214 must be larger than the valve stem 200 in order to cast an obscuration shadow such that the width thereof can be measured by the camera 202. A typical light bank 214 would be about twelve inches square.

The camera 202 scans a linear slice of the test light 220 that includes a shadow portion that is obscured by the valve stem 200 and converts the pattern of light and dark areas received into an sensor output signal 222 indicative of the light intensity received at the location of each element 212 in the array 210 in analog pixel format. The output signal 222 is then converted by a video control board 224 into a digital first signal 226 indicative of the change in diameter of the valve stem 200. This may be accomplished with a "frame grabber" circuit, well known in the art, that digitizes each pixel reading. The first signal will be, in this case, an array of numbers indicating the energy collected on each element 212 during a predetermined exposure time. The first signal 226 is in turn received by a computer 228 that produces a second signal 230 indicative of the axial load according to Equation (2). The computer 228 may include an image processing board having a digital signal processor chip to speed the processing time.

Alternatively, instead of using a CCD array, an array of photodiedes can be used. In this case, each photodiode gives a current output that is proportional to the instantaneous light intensity received.

The resolution can be improved by dithering the image, by moving the camera back and forth, or preferably by oscillating the image with the camera optics.

The invention is not limited to back-lighted geometries as described hereinbefore with reference to FIG. 4. The system can be arranged to obtain an image of an illuminated portion of the valve stem 200 to obtain a measurement of the width of the valve stem 200, instead of measuring an obscured portion of the test light.

Figure 5:
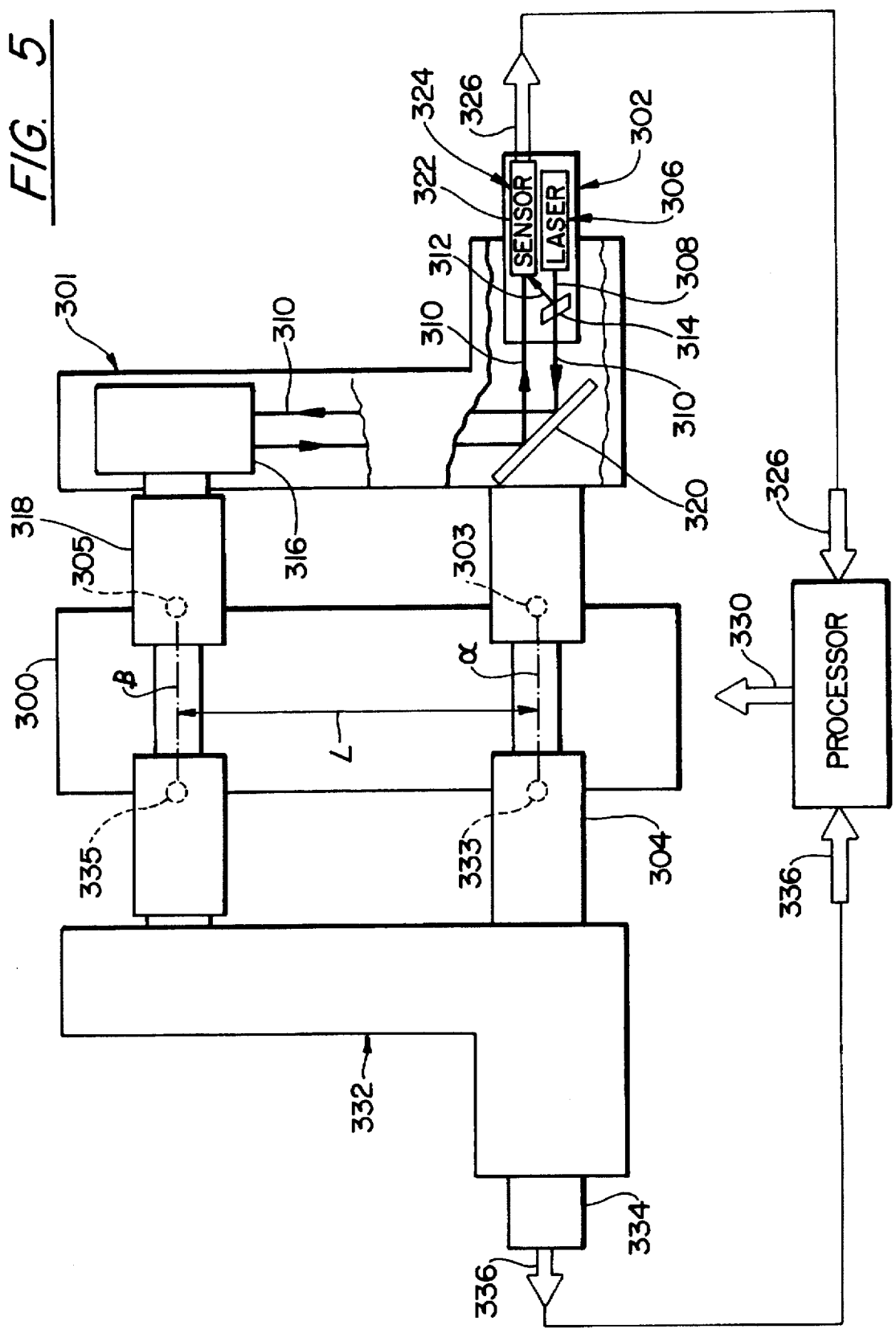
FIG. 5 is a schematic view of an embodiment of the invention that uses an interferometer to obtain a measurement of an axial load on a valve stem.

FIG. 5 schematically illustrates in a partially broken away view another embodiment of the invention for measuring an axial load on a valve stem 300. A first system 301 measures a change $\Delta L$ in a gage length L between two points 303, 305 on the valve stem 300, indicated in FIG. 5 by dashed circles, that are located on longitudinally separated planes $\alpha$ and $\beta$, that are transverse to the central axis of the valve stem. A line connecting points 303 and 305 is preferably substantially parallel to the central axis of the valve stem 300. A measurement of $\Delta L$ can be used to determine the axial load according to Equation 1.

The measurement of $\Delta L$ can be made with a commercially available laser interferometer system 302 that is rigidly coupled to the valve stem 300 at plane $\alpha$ with a V-block clamp 304 or other suitable hardware. The interferometer 302 includes a laser 306 for producing a beam 308 of about monochromatic, coherent light. The beam 308 is split into a test beam 310 and a reference beam 312 by a beam splitter 314, such as a half-silvered mirror, that can be located within interferometer 302. The test beam 310 is reflected back to the interferometer 302 by a reflector mirror 316, preferably provided by a retroreflector, that is rigidly coupled to plane by V-block mounting hardware 318. Because of the travel of the valve stem 300, there is a limited area to mount any measuring apparatus. Therefore, the interferometer 302 typically will be mounted transverse to the valve stem 300 as illustrated. This arrangement requires the use of an angled mirror 320 for directing the test beam 310 to reflector mirror 316 and for directing the returning test beam 310 to the interferometer 302. Other optical arrangements can also be used, so long as the only variable is the distance between mirrors 316 and 320.

The test beam 310 and the reference beam 312 are recombined at a receptive surface 322 of a sensor 324 located in the interferometer 302. The sensor 324 provides an output signal indicative of an alternating pattern of light and dark bands, or fringes, on the receptive surface 322 caused by interference between the test beam 310 and the reference beam 312, which is indicative of the relative phases of the reference beam 312 and the test beam 310. The test beam has a test path length that varies directly with a changing distance between the first point 303 and the second point 305, which distance changes with a foreshortening of the valve stem 300 under an axial load. The reference beam 312 has a fixed path length. Changes in the test path length cause changes in the phase of the test beam 310 at the receptive surface 322, thereby causing a gradual cycling from high to low intensity at a point in the beam intersection region which is measured by the sensor 324, which gives an appearance of movement of interference fringes. The output of the sensor 324 is electronically interpreted by the interferometer 302, for example, by counting the number of fringes that pass a point on the sensor surface 322, to produce a first signal 326 indicative of the change in the test path length, which is two times $\Delta L$ for the arrangement illustrated. The first signal 326 can then be used by a data processor 328 to determine a second signal 330 indicative of the axial load according to Equation 1.

FIG. 5 also shows a redundant, second system 332, including a second interferometer 334, mounted opposite the first system 301 for measuring a second $\Delta L$ between two points 333 and 335 that are also located on planes $\alpha$ and $\beta$, respectively. Interferometer 334 produces an output signal 336 that can be averaged with first signal 326 by data processor 330 to compensate for any bending of the valve stem 300 in order to obtain a more accurate measurement of the axial load. It will be understood that redundant systems, such as that illustrated in FIG. 5, are within the scope of the invention and can be implemented in other embodiments of the invention discussed herein.

Figure 6:
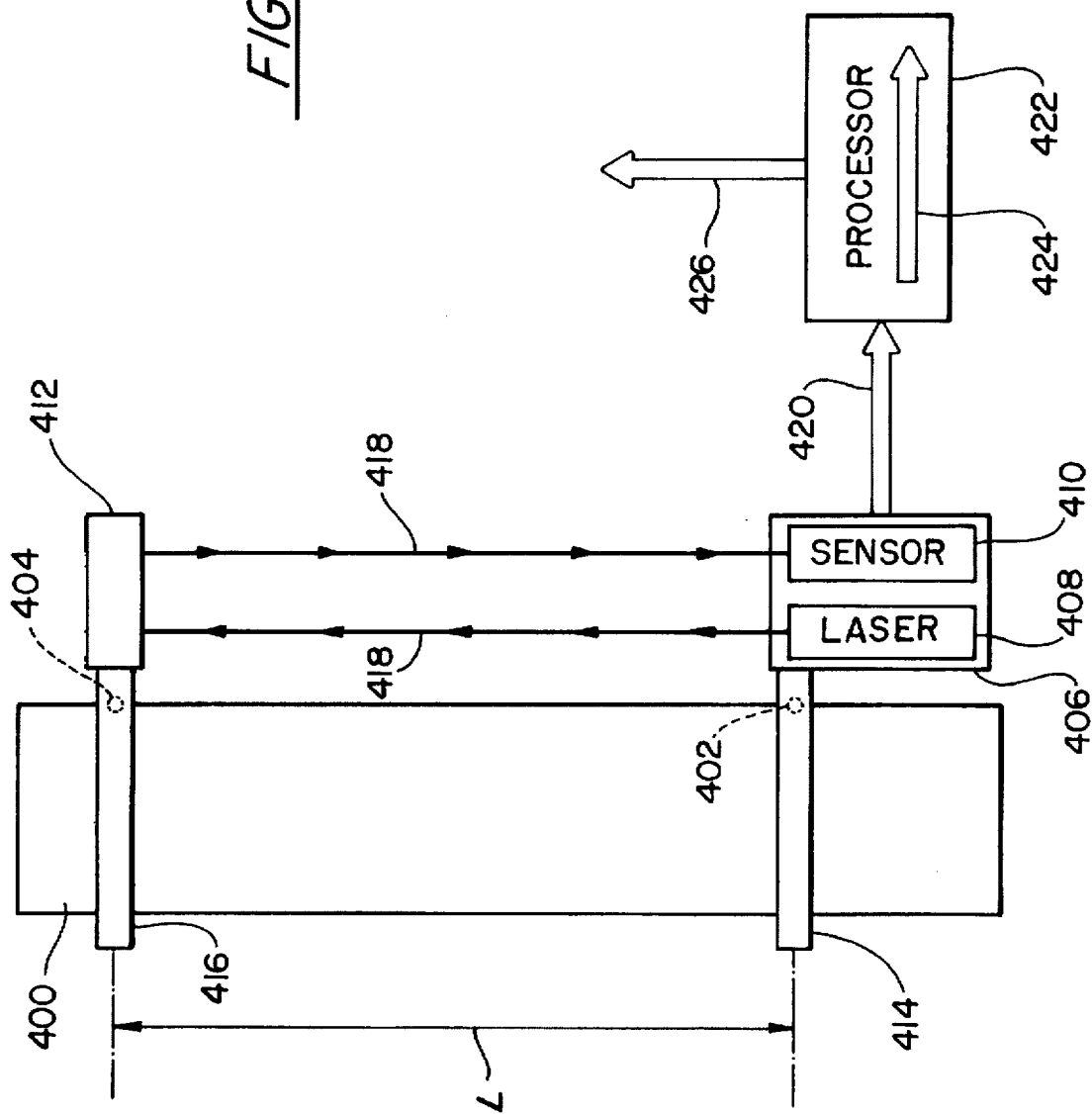
FIG. 6 is a schematic view of an embodiment of the invention that uses an optical range finder to obtain a measurement of an axial load on a valve stem.

FIG. 6 illustrates another embodiment of the invention that determines the axial load on a valve stem 400 by measuring L between two points 402 and 404 that are located on the valve stem 400. The arrangement preferably uses an optical range-finder 406. The range-finder 406, which includes a light source, such as a laser 408, and a photosensor 410, is rigidly coupled to the valve stem 400 at a first longitudinal position that includes point 402. A non-mirrored reflector 412 is rigidly coupled to the valve stem 400 at a second longitudinal position that includes point 404, preferably such that the range-finder 406 and the reflector 412 are positioned at about the same polar angle. Each can be mounted with any suitable hardware, such as, for example, V-block clamps 414, 416.

The light source 408 produces a pulsed test beam 418 which is received by the sensor 410 after being reflected by the reflector 412. The range-finder 406 includes circuitry (not shown) for determining the time of flight of the test beam 418, which when multiplied by the speed of light provides a direct measurement of 2 L.

An output signal 420 from the range-finder 406 is indicative of 2 L. A programmed processor 422 or an equivalent circuit can compare the output signal 420 to a predetermined, unstressed gage length to determine $\Delta L$ and output a first signal 424 indicative thereof. The first signal 424 can then be related to the axial strain according to Equation 1 by the processor 422, which can then output a second signal 426 indicative of the axial strain.

Valve stems in MOV's typically are subjected to both an axial load (thrust) and a torsional load (torque). The torsional load can cause an error in a measurement of the axial load because the torque also can cause longitudinal and diametral deformations. Therefore, it is important to separate out the effects of the torsional load from the measurement of the axial load. It also can be very useful to obtain an independent measurement of the torsional load.

Figure 7:
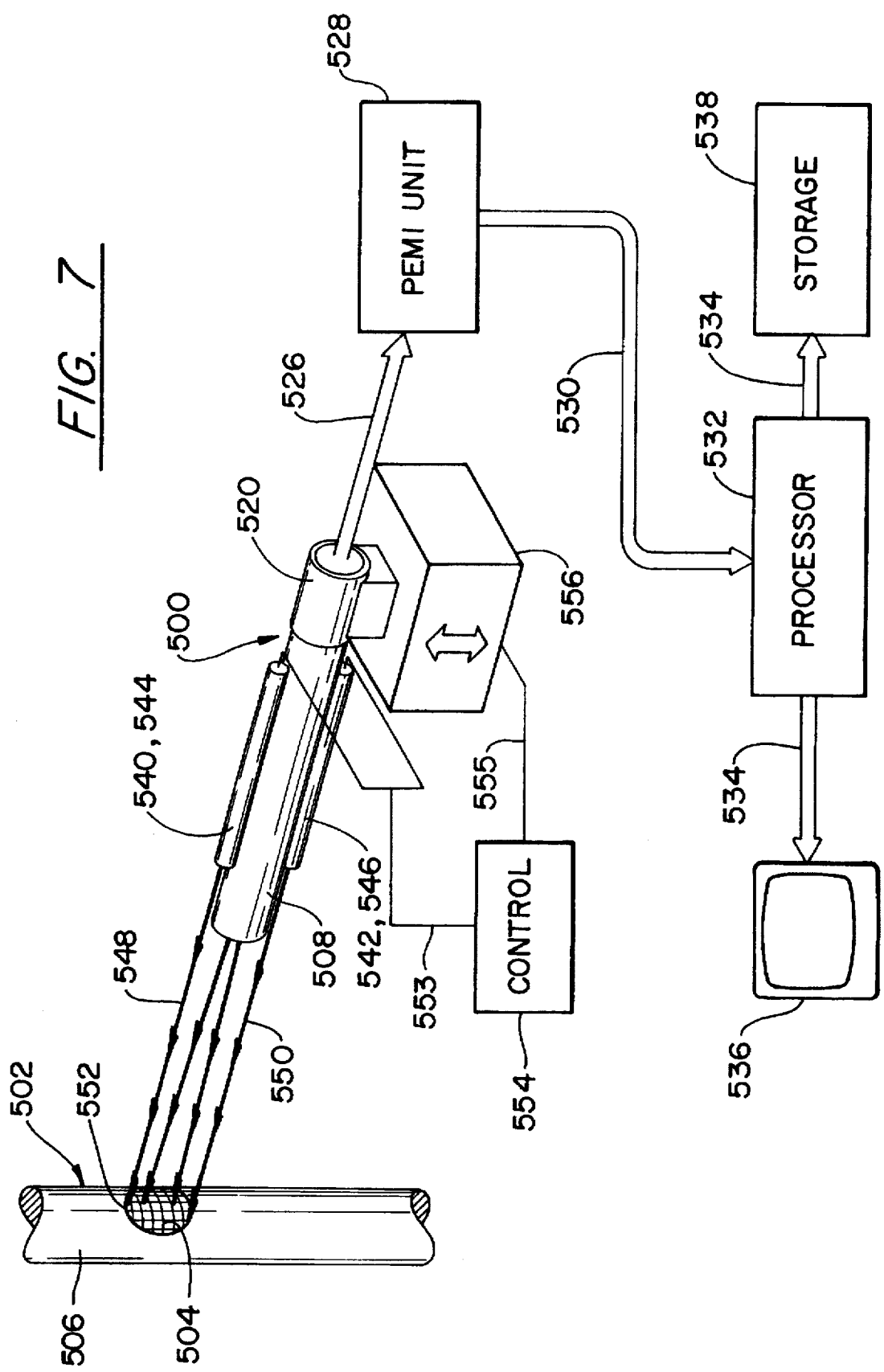
FIG. 7 is a schematic illustration of an embodiment of the invention that uses a Moiré interferometer to measure axial loads on a valve stem.
Figure 8:
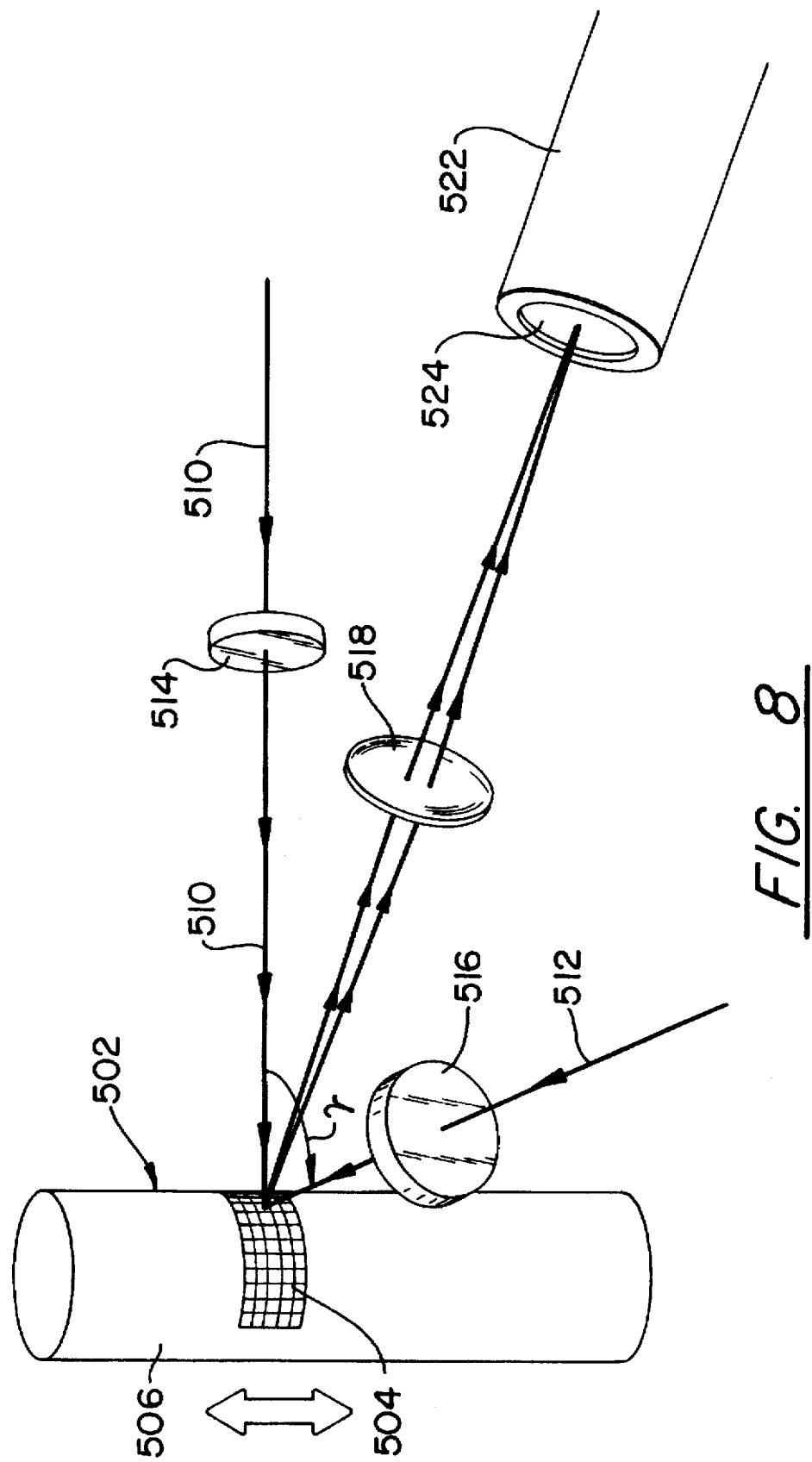
FIG. 8 is a schematic detail of the optical arrangement of the system illustrated in FIG. 7.

FIG. 7 illustrates another embodiment of the invention that incorporates a high sensitivity Moiré laser interferometer 500, such as, for example, a P.E.M.I. system manufactured by IBM Corporation, to measure full field strain on a cylindrical member, such as a valve stem 502. Axial loads and also torsional loads can be obtained with this system. The principles of Moiré laser interferometry for determining whole-field displacements and strains can be found in an article by Y. Ouo et al., IBM Journal of research and Development, Vol. 37, No. 5, p. 635, September 1993, herein included by reference. A detail of an optical arrangement ifor this embodiment is schematically illustrated in FIG. 8. An advantage of this system is that it is non-contacting. The light source and the light sensor are not attached to the valve stem 502. The interferometer system 500 only requires that a crossed line diffraction grating 504 with orthogonal grating lines either be formed directly on the valve stem 502 or adhered to the surface 506 of the valve stem 502 such that the grating 504 physically deforms as does the valve stem surface 506 under a load condition. The grating 504 takes up very little space on the valve stem 502 and does not interfere with the operation of the valve.

A laser 508 in the interferometer produces a test light that is split into a pair of test beams 510, 512 in a plane about transverse to the valve stem 502. Directing optical components 514 and 516 direct test beams 510 and 512 to converge with an included angle γ on the grating 504. A virtual grating (not shown) is formed by the interference between the test beams 510, 512, the frequency f of which is a function of the wavelength of the test beams 510, 512 and the included angle γ. The test light, in the form of the virtual grating, interacts with the specimen grating 504 and forms a fringe pattern, which is a first contour map, indicative of displacements in the plane of the test beams 510, 512. An additional two beams (not shown) in a plane that includes the longitudinal axis of the valve stem 502, is typically used to produce a second contour map indicative of displacements in the longitudinal direction. The contour maps are focused by a lens 518 in the interferometer camera head 520 onto an image sensor 522. The image sensor 522 is responsive to the test light for producing an interference signal 526 indicative of the interference pattern of the test light scattered from the diffraction grating 504. The fringe gradients provide a direct measurement of the linear strain values.

A PEMI unit 528 responsive to the interference signal 526 provides a strain signal 530 indicative of the full field strain on the valve stem 502. The strain signal 530 is passed to a signal conditioner, which can include a programmed data processor 532, that provides a first signal 534 indicative of an average strain (where the strain is defined as δS/S, S being a spacing between two fixed points on the surface in a known unloaded condition and δS being a change in S under a load) acting parallel to a plane defined by the pair of test beams 510, 512. The data processor 532 then can determine the axial load according to Equation 1 if the test beams 510, 512 are coplanar with the longitudinal axis of the valve stem 502, and according to Equation 2 if the test beams 510, 512 define a plane that is transverse to the longitudinal axis of the valve stem 502. A second signal 534 indicative of the load can then be output to peripheral devices, such as a display 536 or a signal recorder 538.

Since the full-field strain is measured, the torsional load can also be obtained from the strain signal 530. A twist angle between two longitudinally separated planes can be extracted from the strain signal 530. The twist angle can be related to the torsional load via Equation 3.

The arrangement preferably includes a tracking system for maintaining the focus of the image sensor 522 on the diffraction grating 504 during movement of the valve stem 502 in an axial direction. The tracking system can include a pair of tracking light sources 540, 542 and a pair of associated tracking photosensors 544, 546 that are attached to the camera head 520. Light beams 548, 550 from the tracking light sources 540, 542 are focused onto a pair of markers, such as, for example, opposite sides of a dark ring 552 that is positioned around the grating 504. The tracking photosensors 544, 546 each provide a tracking signal 553 indicative of the intensity of light reflected from the ring 552 to a control unit 554. The control unit 554 then provides a feedback signal 555 to a motorized platform 556 upon which the camera head 520 is mounted. The platform 556 responds to the feedback signal by moving to keep the light beams 548, 550 directed onto the ring 552 such that the intensity of light received by each of the tracking photosensors 544, 546 is kept about constant, and thereby maintain the focus of the image sensor 522 on the grating 504.

Figure 9:
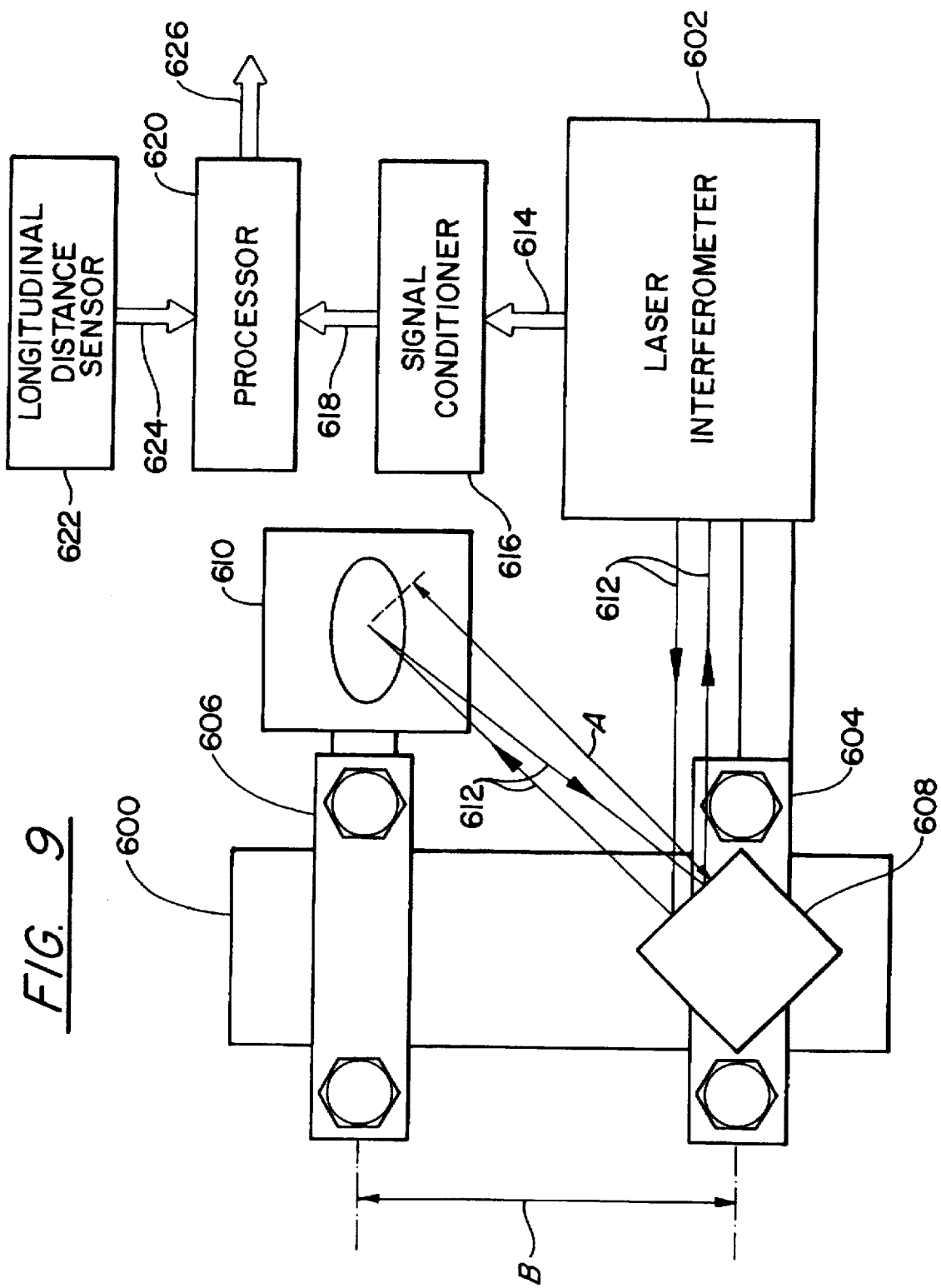
FIG. 9 is a schematic view of an embodiment of the invention that can simultaneously measure axial and torsional loads on a valve stem.

FIG. 9 schematically illustrates an embodiment of the invention that can measure the applied torque on a generally cylindrical member, such as a valve stem 600, with a laser interferometer 602. First and second attachment mechanisms, such as, for example, first and second V-block clamps 604, 606, are rigidly coupled to the valve stem 600 at first and second longitudinal positions, respectively. The interferometer 602 and directing optics, such as first mirror 608, are rigidly coupled to the first clamp 604. A reflector, such as a second mirror 610, is rigidly coupled to the second clamp 606 at a position that is rotated in a polar direction from the first mirror 608. The first and second mirrors 606, 608 can be provided by corner cubes.

The interferometer 602 includes a laser (not shown) for directing a test beam 612 of coherent, monochromatic light to the first mirror 608. The test beam 612 is directed by the first mirror 608 to the second mirror 610, which reflects it back to the first mirror 608, and the first mirror 606 directs it back to an optical sensor (not shown) in the interferometer 602. The laser also directs a reference beam (not shown) having a fixed path length to the sensor. The test beam, which has a path length that varies with the distance A between the first and second mirrors 606, 608, and the reference beam typically have different phases at the sensor, producing a pattern of interference fringes that is detected by the sensor and interpreted by the interferometer to produce an interference signal 614 indicative of a change in the path length of the test beam 612 from an unloaded condition. A signal conditioner 616 can be used to smooth and digitize the interference signal 614 and produce a first signal 618 indicative of a change in A to a data processor 620. A longitudinal distance measuring system 622 that is arranged to measure a change in the longitudinal distance B between the first and second longitudinal positions, such as, for example, the system described hereinabove with reference to FIG. 5, can be used to provide a longitudinal distance signal 624 indicative of the change in B to the processor 620. The processor 620 can also calculate the axial thrust using the information contained in the longitudinal distance signal 624, and the second signal 626 can be indicative of the axial thrust.

The processor 620, which can be programmed with the geometry of the system in an unloaded condition, can then determine from the input signals 618, 624 the relative twist angle between the clamps 606, 608 at the first and second longitudinal positions, respectively. The processor 620 can take the relative twist angle and determine the torsional load according to Equation (3) and output a second signal 626 indicative thereof.

Figure 10:
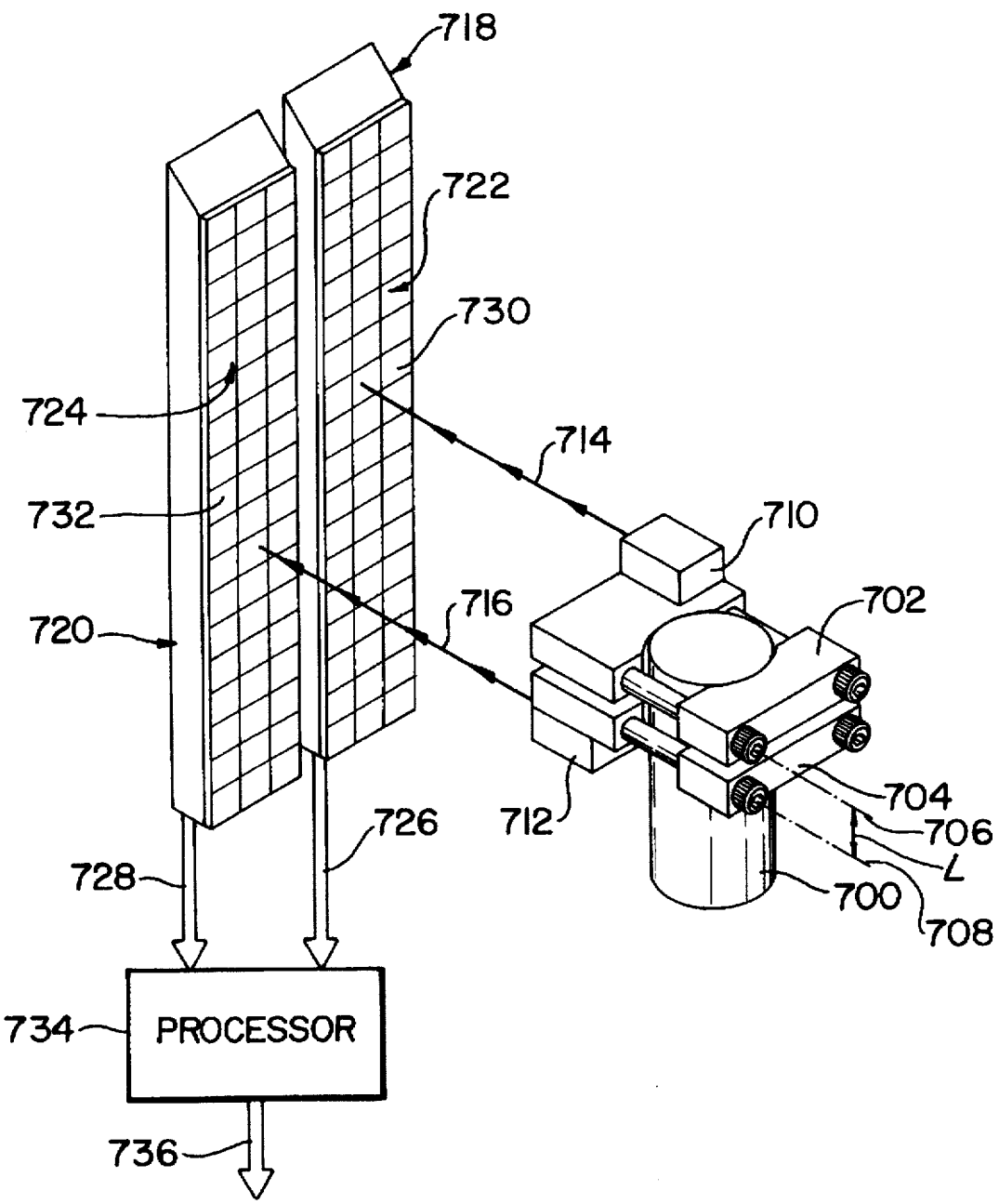
FIG. 10 is a schematic view of an embodiment of the invention that can simultaneously measure axial and torsional loads on a valve stem.

FIG. 10 schematically illustrates another device that simultaneously monitors the position and orientation of objects rigidly coupled to two different positions on a cylindrical member, such as a valve stem 700, from which the torque and the thrust can be determined. First and second clamping devices, such as first and second V-block clamps 702, 704 are fixed to different longitudinal positions 706, 708 on the valve stem 700 such that they take on the same axial position and polar orientation as the planes to which they are attached.

The clamping devices 702, 704 have attached first and second light sources 710, 712, respectively, that direct first and second test beams 714, 716, respectively, of light onto first and second image sensors 718, 720, respectively, that are not attached to the valve stem 700. The image sensors 718, 720 can include photosensors, such as, for example, analog position sensors (not shown), or first and second array detectors 722, 724, respectively. Due to size constraints, it may be necessary for the detectors 722, 724 to follow the valve stem 700 in its travel in a longitudinal direction. The detectors 722, 724 provide first and second position signals 726, 728, respectively, that are indicative of a position on first and second sensor surfaces 730, 732, respectively, that are illuminated by the test beams 714, 716, respectively. Each position signal 726, 728 includes an "X" signal indicative of a positional change transverse to the longitudinal axis of the stem and a "Y" signal indicative of a positional change parallel to the longitudinal axis. The difference between the two X signals is indicative of torsional deformations and the difference between the Y signals is indicative of axial deformations. Lenses (not shown) can be included to amplify the position changes.

A data processor 734 responsive to the first and second position signals 726, 728 can be used to calculate the difference between the two Y signals as the valve stem 700 is loaded and using the material and geometric properties of the stem 700 to calculate the axial load according to Equation (1). Similarly, the data processor 734 can be used to calculate the difference between the X signals and using the geometric properties of the stem 700 along with the distance from the light sources 710, 712 to the detectors 722, 724, respectively to determine θ, the twist angle. θ and known geometric and material properties of the valve stem 700 can then be used to then calculate the applied torque using Equation (3). The output 736 of the processor 734 can be indicative the axial load, the torsional load, or both.

An advantage of this arrangement is that the gage length L can be adjusted to a selected distance. The user can space the first and second clamps 702, 704 as far apart as is allowed by valve constraints. The farther apart the two clamps 702, 704, the more accurate the measurement will be.

Figure 11:
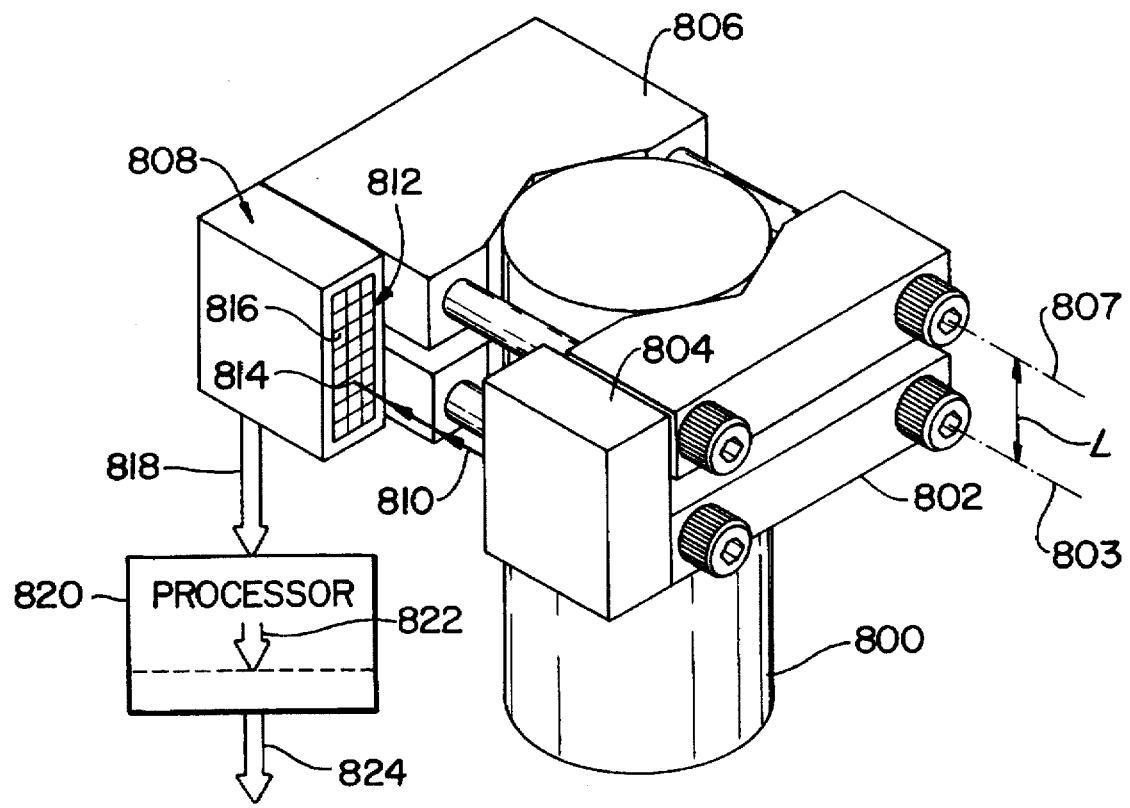
FIG. 11 is a schematic view of a second embodiment of the invention that can simultaneously measure axial and torsional loads on a valve stem.

FIG. 11 illustrates another possible arrangement for simultaneous measurement of torque and axial load on a cylindrical member, such as a valve stem 800. In this arrangement, a first clamp 802 is fixed to the valve stem 800 at a first longitudinal position 803 and holds a light source 804, while a second clamp 806 is fixed to the valve stem 800 at a second longitudinal position 807 spaced a nominal distance L from first position 803 and holds a sensor 808. The light source 804 preferably includes a laser for producing a test beam 810. The sensor 808 preferably includes a bidirectional detector, such as, for example, an array detector 812. The test beam 810 illuminates a small spot 814 on a receptive surface 816 of the detector 812.

An axial strain will produce a change in the position of the spot 814 in a first direction that is about parallel to the longitudinal axis of the valve stem 800. An angular deformation will produce a change in the position of the spot 814 in a second direction orthogonal to the first direction and about transverse to the longitudinal axis of the valve stem 800. As with the embodiment discussed hereinbefore with reference to FIG. 10, an arrangement of lenses can be used to amplify the the position shanges. The sensor 808 produces an output signal 818 that is indicative of the position of the spot 814 in each of the first and second directions. A data processor 820 responsive to the output signal 820 can be programmed to provide a first signal 822 indicative of a change in position of the spot 816 from when the valve stem 800 is not subject to a load. The processor 820 can then take the first signal 822 and produce a second signal 824 that is indicative of the axial load, the torque or both according to Equations (1) and (3).

Figure 12:
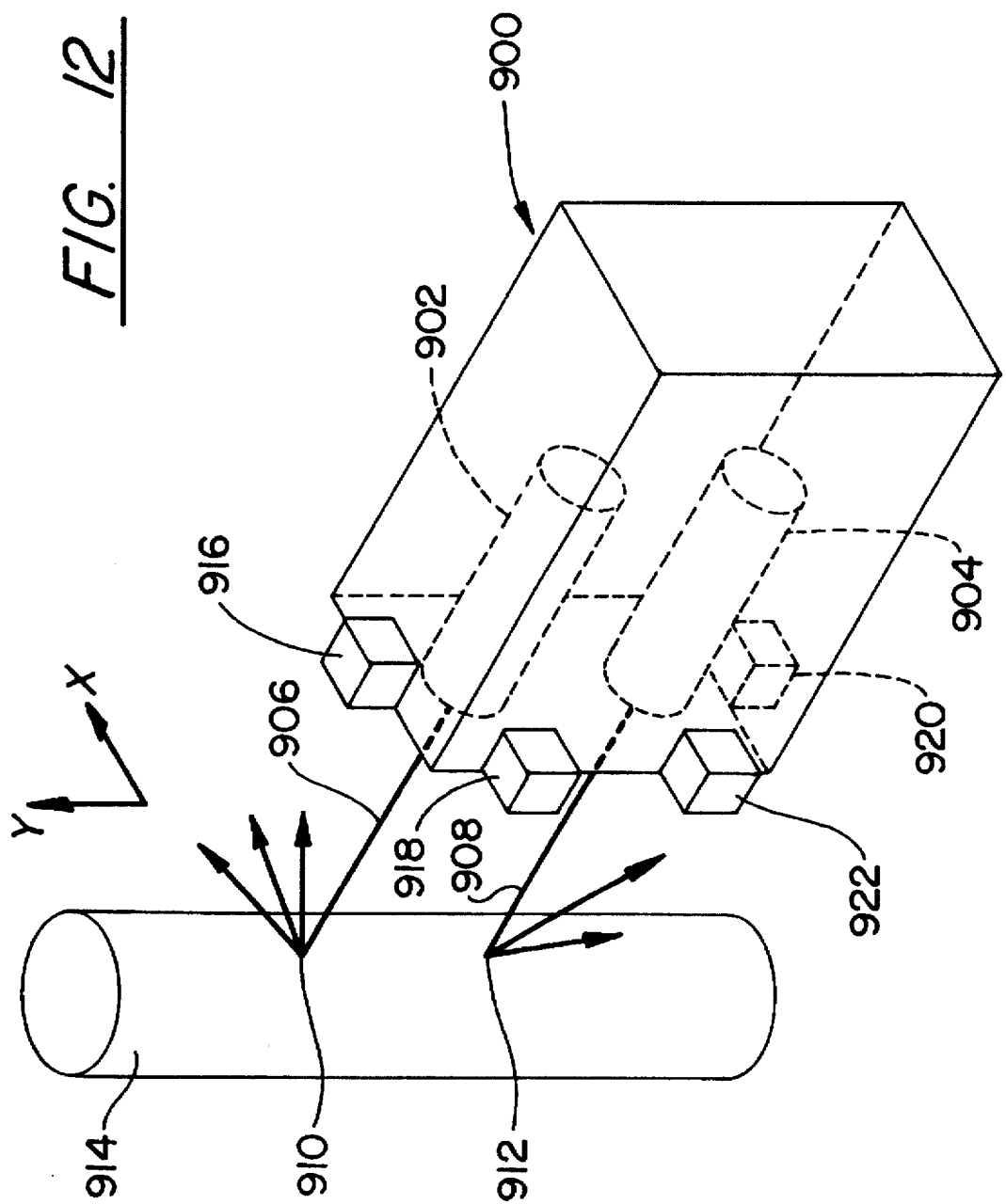
FIG. 12 is a schematic view of a third embodiment of the invention that can simultaneously measure axial and torsional loads on a valve stem.

In addition to the devices and methods described hereinbefore, other techniques that do not require any attachment to the valve stem or modification of the valve stem can be used to measure valve stem forces. One such device is illustrated in FIG. 12. A portable device 900, preferably packaged in a hand-held enclosure, includes first and second lasers 902, 904 for producing and directing first and second test beams 906, 908, respectively, of light of different frequencies. To obtain measurements of the torque and the axial thrust, the test beams 906, 908 are focused onto first and second points 910, 912, respectively, located on a load bearing part of the valve, such as the valve stem 914 or yoke (not shown). The device also includes a first y-axis angular backscatter detector 916, a first x-axis angular backscatter detector 918, a second y-axis angular backscatter detector 920, and a second x-axis angular backscatter detector 922. By analyzing the doppler shift of the x and y components of angular backscatter from the target surface created by the light, both tension or compression (thrust) and intersecting plane relative motion (torque) on the part can be extracted with extreme accuracy. In the case of a rising valve stem the speed and the acceleration can also be accurately determined. This data will give precise valve position information at any given point in time. In addition, comparison of speed and acceleration data to the torque and the thrust data will yield motor power characteristics as well as valve drive train degradations.

The device 900 also preferably includes capability for battery operation for easy field use. Inclusion of an on-board data storage device and means for downloading the data to a data processor, such as, for example, a personal computer, for later analysis can enhance the device's versatility. The device 900 also preferably includes a display, such as a small matrix screen to enable field verification of correct signature acquisition while the operator is still at the MOV.

Vibrational data of key parts of the MOV, such as, for example, the limit switch cover, can be obtained by laser doppler shift measurements or other similar means included in the device 900. The discrete sound transients produced by mechanical functions within the valve can be separated from environmental background noise. Analysis of resulting data will allow precise determination of limit and torque switch trips. Motor energization or coast phases and gear train anomalies would also exhibit specific vibrational frequencies. Comparison of individual switch trips to motor energization and valve position would enable verification of correct electromechanical setup of the MOV.

Holographic interferometry can also be integrated into the device 900. This would entail producing a static state hologram of the valve and storing it in memory. The saved hologram would then be compared to a dynamic hologram of the valve during operation. Variations of valve geometry on the order of microinches can be discernable from analysis of the resulting interference patterns. The three-dimensional quality of holographic imaging enables not only rotation (torque) and elongation (thrust) of valve components, such as, for example, the valve stem and the yoke, but accurate measurement of the cross sectional dimensions of the component. The ability to simultaneously obtain all three measurements significantly increases the accuracy and reliability of the measurement.

Other emerging measurement technologies may be used in development of the data acquisition functions of this device 900. For example, speckle pattern interferometry has many of the special attributes of holographic interferometry but is far less susceptible to system vibration.

It will be appreciated that each of the measurements described hereinbefore can be conducted at different times, for example at a first time under a no load condition and at other times under load conditions, to obtain measured changes in the axial and torsional loads on the stem.

The invention having been disclosed in connection with the foregoing variations and examples, additional variations will now be apparent to those skilled in the art. The invention is not intended to be limited to the variations specifically mentioned, and accordingly reference should be made to the appended claims rather than to the foregoing discussion of preferred examples, to assess the scope of the invention in which exclusive rights are claimed.

What is claimed:

1. An optical device for measuring a load in a generally cylindrical-shaped valve stem mounted in a motor operated valve, the valve stem being movable in a longitudinal direction defined by a cylindrical axis of the valve stem, the optical device comprising:

first means for producing a test light that is modified by a physical change in the valve stem caused by the load;

second means for receiving the test light and converting the same to a first signal indicative of the physical change; and third means for converting the first signal to a second signal indicative of the load, wherein the physical change is manifested by one of a change in a distance and a change in angular separation between spaced apart first and second points on the valve stem.

2. The device of claim 1, wherein the first and second points are circumferentially spaced apart.

3. The device of claim 2, wherein the first and second points are diametrally opposed from each other.

4. The device of claim 3, wherein the first means includes a light source for directing a wide beam of light towards the valve stem in a direction generally transverse to the longitudinal direction, the beam being wider than the valve stem such that the valve stem obscures a portion of the test beam when illuminated by the beam.

5. The device of claim 4, wherein the physical change includes a change in the diameter of the valve stem.

6. The device of claim 5, wherein the second means includes a light sensor rigidly coupled to the valve stem.

7. The device of claim 6, wherein the light source includes a laser rigidly coupled to the valve stem and having means for converting a test light output from the laser into a wide parallel beam in a plane about transverse to the cylindrical axis, and wherein the light sensor includes means for providing a sensor output signal indicative of a change in intensity of illumination on a surface of the light sensor that is proportional to the change in the diameter of the valve stem.

8. The device of claim 6, wherein the light source includes a member of the group of illuminators consisting of a first light panel that includes a high frequency fluorescent lamp, and a second light panel that includes an incandescent lamp energized by direct current, and wherein the light sensor comprises an array detector that includes a plurality of individual photosensitive elements each responsive to a change of intensity of illumination on a receptive surface of the element.

9. The device of claim 1, wherein:

the test light comprises a pair of laser beams converging with an included angle A on a diffraction grating fixed to the valve stem; and the second means comprises a light sensor focused on the diffraction grating, wherein the light sensor is responsive to the test light for producing an interference signal indicative of an interference pattern of the test light scattered from the diffraction grating, and a signal conditioner for providing the first signal in response to the interference signal, the first signal being indicative of an average strain acting parallel to a plane defined by the pair of laser beams.

10. The device of claim 9, wherein the second signal is indicative of an axial load.

11. The device of claim 9, wherein the second signal is indicative of a torsional load.

12. The device of claim 9, wherein the optical system comprises fourth means for focusing the test light scattered from the diffraction grating onto the light sensor during movement of the valve stem in an axial direction.

13. The device of claim 1, wherein the first and second points are spaced apart in a direction substantially parallel to the cylindrical axis.

14. The device of claim 13, wherein the first means comprises a first source of about monochromatic, coherent light rigidly coupled to the valve stem for producing the test light, the test light having a first path length that varies directly with a changing distance between the first point and the second point, and wherein the second means includes a first light sensor rigidly coupled to the valve stem for receiving the first test beam.

15. The device of claim 14, wherein the first signal is indicative of changes in the phase of the first test beam at the first light sensor.

16. The device of claim 15, wherein the first light sensor provides a sensor signal indicative of an interference pattern between the first test beam and a first reference beam of coherent monochromatic light having a fixed path length, and wherein the second means comprises signal conditioning means for providing the first signal in response to the sensor signal.

17. The device of claim 14, wherein the first signal is indicative of a time of flight of the first test beam between the first and second points.

18. The device of claim 14, wherein the first means comprises a second source of about monochromatic, coherent light rigidly coupled to the valve stem for producing a second test light, the second test light including a second test beam having a second path length that varies directly with a changing distance between spaced apart third and fourth points located on the valve stem substantially diametrically opposite the first and second points, respectively, and wherein the second means includes a second light sensor rigidly coupled to the valve stem for receiving the second test beam, the first signal being indicative of an average of the change in distance between the first and second points and a change in distance between the third and fourth points.

19. The device of claim 13, wherein:

the first means includes:

first coupling means rigidly connected to the valve stem at a first longitudinal position that includes the first point; and a laser rigidly connected to the first coupling means for producing a laser beam in a plane about transverse to the cylindrical axis at about the first longitudinal position, the test light comprising the laser beam; and the second means includes:

second coupling means rigidly connected to the valve stem at a second longitudinal position spaced from the first longitudinal position, the second longitudinal position including the second point;

light sensor means rigidly connected to the second coupling means and including a sensor surface positioned such that the laser beam illuminates a spot on the sensor surface, for producing a sensor signal indicative of a position of the spot; and signal conditioning means for producing the first signal in response to the sensor signal, wherein the first signal comprises a length signal that manifests a longitudinal separation of the first and second points.

20. The device of claim 19, wherein the second signal comprises an axial load signal indicative of an axial load on the valve stem.

21. The device of claim 20, wherein the first signal further comprises a twist signal that manifests a twist angle in a polar direction between the first and second fixed points.

22. The device of claim 21, wherein the second signal further comprises a torsional load signal indicative of a torsional load on the valve stem.

23. The device of claim 13, wherein:

the first means includes:

first coupling means rigidly connected to the valve stem at a first longitudinal position that includes the first fixed point; and a first laser rigidly connected to the first coupling means for producing a first laser beam;

second coupling means rigidly connected to the valve stem at a second longitudinal position that includes the second fixed point; and a second laser rigidly connected to the second coupling means for producing a second laser beam, wherein the test light comprises the first and second laser beams; and the second means includes light sensor means not coupled the valve stem, comprising a sensor surface illuminated at first and second spots by the first laser beam and the second laser beam respectively, for producing a sensor signal indicative of a separation between the first and second spots; and signal conditioning means for producing the first signal in response to the sensor signal, wherein the first signal comprises a length signal that manifests a longitudinal separation of the first and second fixed points.

24. The device of claim 23, wherein the first signal further comprises a twist signal that manifests a twist angle in a polar direction between the first and second fixed points.

25. The device of claim 24, wherein the first and second laser beams are directed in spaced apart planes substantially transverse to the cylindrical axis, and wherein the light sensor means comprises a first bidirectional sensor having a first sensor surface illuminated at the first spot by the first laser beam, and a second bidirectional sensor having a second sensor surface illuminated at the second spot by the second laser beam, and wherein the sensor signal comprises a first separation signal and a first angle signal manifesting a longitudinal position and a polar position of the first spot, respectively, and a second separation signal and a second angle signal manifesting a longitudinal position and a polar position of the second spot, respectively.

26. The device of claim 25, wherein the second signal comprises an axial load signal indicative of an axial load on the valve stem and a torsional load signal indicative of a torsional load on the valve stem.

27. A method of measuring a load on a generally cylindrically-shaped valve stem in a motor operated valve, comprising the steps of:

illuminating sensor means responsive to light with a test light that is modified by a physical change in the valve stem caused by the load;

providing with the sensor means a first signal indicative of the physical change in response to the test light; and providing a second signal indicative of the load on the valve stem in response to the first signal, wherein the physical change manifests a change in a distance between two spaced apart points on the valve stem.

28. The method of claim 27, wherein the two points are spaced apart in a direction substantially parallel to a cylindrical axis of the valve stem.

29. The method of claim 27, wherein the two fixed points are spaced apart in a direction substantially transverse to a cylindrical axis of the valve stem.

30. The method of claim 29, wherein the step of illuminating includes directing the test light in a wide beam towards the valve stem in a direction generally transverse to the longitudinal direction the test light and obscuring a portion of the test light with the valve stem.

31. The method of claim 30, wherein the physical change manifests a change in the diameter of the valve stem.

32. The method of claim 31, wherein the step of illuminating includes the steps of rigidly coupling a light source to the valve stem, rigidly coupling the sensor means to the valve stem a fixed distance apart from the light source and producing the test light with the light source, and wherein the step of providing a first signal includes the step of responding to a change in the width of the obscured portion of the test light with the sensor means.

33. The method of claim 32, wherein the sensor means comprises an array detector that includes a plurality of discrete light sensors, and wherein the light source includes a member of the group of illuminators consisting of:

a laser including means for producing a wide parallel beam;

a first light panel that includes a high frequency fluorescent lamp; and a second light panel that includes an incandescent lamp energized by direct current.

34. The method of claim 27, wherein the step of illuminating comprises the steps of:

fixing a diffraction grating to one of the valve stem and a valve yoke that is reactive to the load;

converging a pair of laser beams with an included angle A in a selected plane on the diffraction grating;

scattering the test light from the grating; and receiving the scattered test light with the sensor means, and wherein the step of providing the first signal comprises the steps of:

producing with the sensor means an interference signal indicative of an interference pattern of the test light scattered from the diffraction grating; and providing the first signal in response to the interference signal, wherein the physical change is an average strain acting in the selected plane.

35. The method of claim 34, wherein the selected plane is about parallel to a longitudinal axis of the valve stem and the second signal is indicative of an axial load.

36. The method of claim 34, wherein the selected plane is about transverse to a longitudinal axis of the valve stem and the second signal is indicative of a torsional load.

37. The method of claim 36, wherein the step of illuminating comprises the step of focusing the test light scattered from the diffraction grating onto the sensor means during movement of the valve stem.

38. The method of claim 28, wherein the sensor means comprises a first light sensor, and wherein the step of illuminating comprises:

rigidly coupling a first light source to the valve stem;

rigidly coupling the first light sensor to the valve stem; and illuminating the first light sensor with a first test beam of about monochromatic, coherent light from the first light source, the first test beam having a first path length that varies directly with changes in the distance between the first point and the second point.

39. The method of claim 38, wherein the first signal is indicative of changes in the phase of the first test beam at the first light sensor.

40. The method of claim 39, wherein the step of illuminating further comprises illuminating the first light sensor with a first reference beam produced by the first light source, the first reference beam having a fixed path length, and wherein the step of providing the first signal includes providing a first sensor signal indicative of an interference pattern between the first test light and the first reference beam, and conditioning the sensor signal for providing the first signal.

41. The method of claim 38, wherein the first signal is indicative of a time of flight of the first test beam between the first and second points.

42. The method of claim 38, wherein the step of illuminating comprises:

rigidly coupling a second light source to the valve stem;

rigidly coupling the second light sensor to the valve stem; and illuminating the second light sensor with a second test beam of about monochromatic, coherent light from the second light source, the second test beam having a second path length that varies directly with changes in the distance between the spaced apart third and fourth points located on the valve stem substantially diametrically opposite the first and second points, respectively, the first signal being indicative of an average of the change in distance between the first and second points and a change in distance between the third and fourth points.

43. The method of claim 28, wherein the step of illuminating includes:

rigidly coupling a laser to the valve stem at a first longitudinal position that includes the first point;

rigidly coupling a sensor surface of the sensor means to the valve stem at a second longitudinal position spaced from the first longitudinal position and that includes the second fixed point; and illuminating a spot on the sensor surface with the test light comprising a laser beam from the laser, the laser beam being in a plane substantially transverse to a cylindrical axis of the valve stem and substantially normal to the sensor surface, and wherein the first signal comprises a length signal that manifests a longitudinal separation of the first and second fixed points and a twist signal that manifests a twist angle in a polar direction between the first and second fixed points.

44. The method of claim 43, wherein the second signal comprises an axial load signal indicative of an axial load on the valve stem and a torsional load signal indicative of a torsional load on the valve stem.

45. The method of claim 28, wherein the step of illuminating includes:

rigidly coupling a first laser to the valve stem at a first longitudinal position that includes the first fixed point;

rigidly coupling a second laser to the valve stem at a second longitudinal position that includes the second fixed point;

providing a sensor surface of the sensor means being uncoupled to the valve stem;

first illuminating the sensor surface at a first spot with a first laser beam from the first laser; and second illuminating the sensor surface at a second spot with a second laser beam from the second laser, wherein the test light comprises the first and second laser beams, and wherein the first signal comprises a length signal that manifests a longitudinal separation of the first and second fixed points and a twist signal that manifests a twist angle in a polar direction between the first and second fixed points.

46. The method of claim 45, wherein the step of first illuminating includes the step of directing the first laser beam in a first direction, wherein the step of second illuminating includes the step of directing the second laser beam in a plane substantially parallel to the first direction, wherein the sensor means comprises a first bidirectional sensor having a first sensor surface illuminated at the first spot by the first laser beam, and a second bidirectional sensor having a second sensor surface illuminated at the second spot by the second laser beam, the sensor surface comprising the first and second sensor surfaces.

47. The device of claim 45, wherein the second signal comprises an axial load signal indicative of an axial load on the valve stem and a torsional load signal indicative of a torsional load on the valve stem.

48. A method for monitoring the performance of a valve connected to pipes at its inlet and outlet ends, the method comprising the steps of:

directing a test light toward said valve;

receiving said test light reflected from said valve, said received test light having been modified by a physical change in said valve caused by an operation of said valve;

analyzing said received test light to obtain information regarding said operation of said valve.

49. The method of claim 48, wherein the step of directing comprises directing said test light toward a limit switch cover of said valve; and wherein the step of analyzing comprises obtaining vibration data regarding said limit switch cover.

50. The method of claim 48, wherein the step of analyzing comprises measuring the doppler shift of said received test light.

51. The method of claim 49, wherein the step of analyzing comprises analyzing said vibration data to identify a limit switch or torque switch trip.

52. The method of claim 49, wherein the step of analyzing comprises analyzing said vibration data to identify a valve motor energization or coast phase.

53. The method of claim 49, wherein said valve further comprises a gear train, and wherein the step of analyzing comprises analyzing said vibration data to identify anomalies in said gear train operation.

54. The method of claim 48, wherein the step of directing comprises directing a first test light toward a limit switch cover of said valve, and directing a second test light toward a portion of said valve other than said valve limit switch cover; and wherein the step of receiving comprises receiving said first test light and said second test light reflected from said limit switch cover and said portion of the valve other than said limit switch cover respectively; and wherein the step of analyzing comprises comparing the information obtained by analyzing said first received test light with the information obtained by analyzing said second received test light in order to separate the sound transients produced by mechanical functions within the valve from environmental background noise.

55. The method of claim 48, further comprising performing the steps of directing, receiving and analyzing during a first time period when said valve is in a static state and forming a static state hologram of said valve; and performing the steps of directing, receiving and analyzing during a second time period when said valve is being operated and forming a dynamic state hologram of said valve; and comparing said static state and said dynamic state holograms to identify variations in the geometry of said valve caused by its operation.

56. A portable device for testing a valve comprising;

a portable enclosure;

first and second sources of light attached to said enclosure;

first and second y-axis angular backscatter detectors attached to said enclosure;

first and second x-axis angular backscatter detectors attached to said enclosure;

wherein said first and second y-axis and said first and second x-axis backscatter detectors are operable to receive light transmitted from said first and second sources of light and reflected from said valve.

57. The device of claim 56, wherein said first source of light comprises a laser operable to generate a beam of light having a first frequency, and said second source of light comprises a laser operable to generate a beam of light having a second frequency.

* * * * *